United States Patent [19]
Zahuranec et al.

[11] 3,773,169
[45] Nov. 20, 1973

[54] APPARATUS FOR USE IN THE MAKE-UP OF TUBE FITTINGS

[75] Inventors: Emery J. Zahuranec, Solon; Ross E. Barth, Euclid, both of Ohio

[73] Assignee: Crawford Fitting Company, Solon, Ohio

[22] Filed: Dec. 21, 1970

[21] Appl. No.: 100,457

Related U.S. Application Data

[62] Division of Ser. No. 812,118, April 1, 1969, abandoned.

[52] U.S. Cl............... 206/46 H, 29/212 R, 29/237, 29/241, 29/433, 206/56 AC, 206/65 K, 221/312 R
[51] Int. Cl............................................. B65d 85/00
[58] Field of Search.................. 29/428, 433, 212 R, 29/237, 453, 241; 221/312 R, 312 A, 312 C; 53/26; 206/65, 65 K, 56 AC, 46 H

[56] References Cited
UNITED STATES PATENTS

| | | | |
|---|---|---|---|
| 1,800,459 | 4/1931 | Maclean | 206/56 AC X |
| 2,619,087 | 11/1952 | Oclassen et al. | 206/56 R X |
| 2,810,243 | 10/1957 | Mellowes | 206/46 H UX |
| 2,882,170 | 4/1959 | Stewart | 206/56 AC X |
| 3,053,384 | 9/1962 | Loomis | 206/46 H |
| 3,103,373 | 9/1963 | Lennon et al. | 285/382.7 X |
| 3,168,774 | 2/1965 | Valkening | 206/46 H X |
| 1,590,591 | 6/1926 | Steffes | 29/212 R UX |
| 1,484,610 | 2/1924 | Meyers | 29/453 UX |
| 3,228,555 | 1/1966 | Pinto | 221/312 X |
| 3,464,590 | 9/1969 | Giannettino | 221/312 X |

FOREIGN PATENTS OR APPLICATIONS 551,823  1/1958  Canada .................. 206/56 AC

*Primary Examiner*—Charlie T. Moon
*Attorney*—Fay, Sharpe and Mulholland

[57] ABSTRACT

An apparatus for use in the make-up of tube fittings of the type wherein ferrules are cammed radially inwardly into engagement with a tube by means of a coupling nut and a camming mouth of a fitting body. The apparatus is comprised of an arbor having a constrictable head and a plurality of groups of generally annular tube fitting elements arranged in coaxial relation on the arbor. Each group of elements comprises two diverse and cooperating ferrules arranged in a particular sequence on the arbor. Upon constricting the head of the arbor a group of ferrules may be passed over the head and assembled in a tube fitting.

7 Claims, 8 Drawing Figures

PATENTED NOV 20 1973 3,773,169
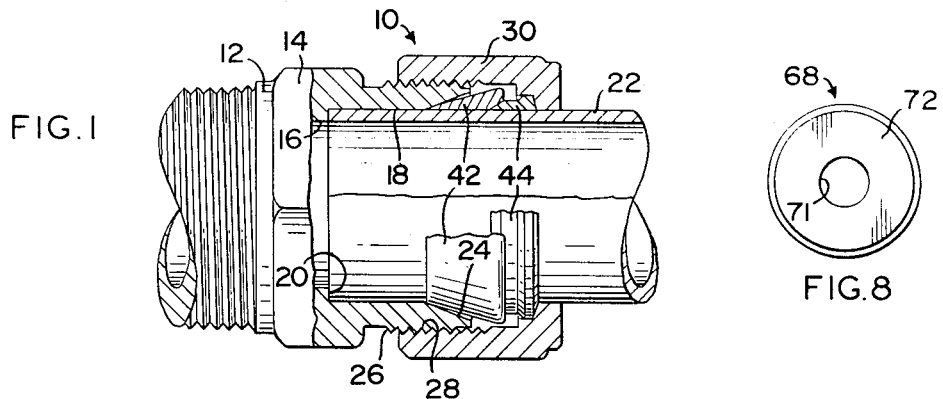
FIG.1
FIG.8
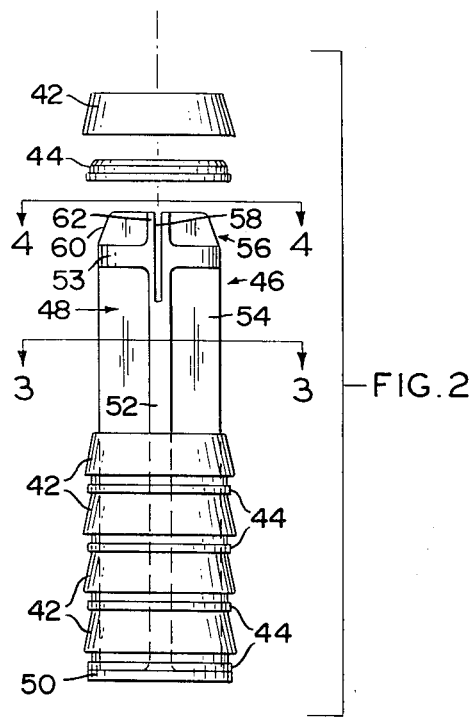
FIG.2
FIG.3
FIG.4
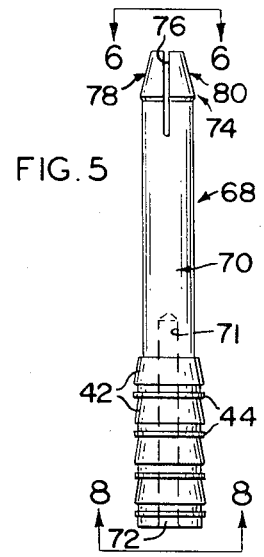
FIG.5
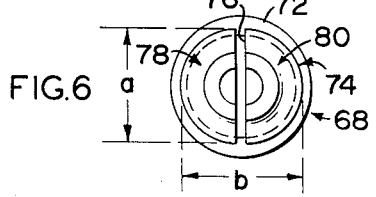
FIG.6
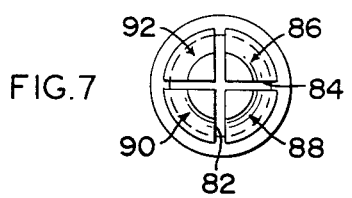
FIG.7
INVENTORS
EMERY J. ZAHURANEC
ROSS E. BARTH
BY
Fay, Sharpe & Mulholland
ATTORNEYS.

APPARATUS FOR USE IN THE MAKE-UP OF TUBE FITTINGS

REFERENCE TO RELATED APPLICATION

This application is a division of application Ser. No. 812,118 filed Apr. 1, 1969.

BACKGROUND OF THE INVENTION

This invention relates to an apparatus for use in the make-up of a tube fitting. More particularly, this invention relates to an apparatus for use in the make-up of assembly of a tube fitting of the type wherein a ferrule is cammed radially inwardly into engagement with a tube by means of a coupling nut and a camming mouth of a fitting body.

In U.S. Pat. No. 3,103,373 to Lennon et al, there is disclosed in FIG. 1 a controlled phase sequential gripping device comprising a coupling body, a coupling nut, and a pair of ferrules. The coupling body includes a camming mouth such that as the coupling nut is threadedly advanced upon the coupling body, the ferrules are sequentially cammed radially inwardly into contact with the external surface of the tube. The movement of the ferrules swages the surface of the tube into a gentle pattern of annular ridges and valleys which prevents withdrawal of the tube from the coupling body. At the same time, the wedging of the ferrules tightly between the surface of the tube and the surface of the camming mouth of the coupling body establishes a seal effective against extremely high pressures and ultra-high vacuums as well.

This invention is directed to an apparatus for use in the make-up of tube fittings such as are shown in FIG. 1 of U.S. Pat. No. 3,103,373. More broadly, this invention is directed to an apparatus for storing and dispensing annular elements manufactured from relatively rigid material such as metal, plastic or the like. It is therefore understood that whereas the preferred embodiment of this invention is shown and described with reference to ferrules for use in tube couplings, the invention should not be considered as limited thereto.

BRIEF DESCRIPTION OF THE INVENTION

Briefly described, the apparatus of this invention comprises an elongated shaft having an outside dimension slightly less than the inside diameter of a pipe fitting ferrule adapted to be received thereon. A fixed abutment integral with said shaft is defined at one end thereof and has a transverse dimension exceeding the internal diameter of the ferrule. The opposite end of the shaft is defined by a protuberance which is slotted. The transverse cross section of the protuberance is generally elliptical in shape with a major and minor axis. The length of the minor axis is substantially equal to or less than the inside diameter of the ferrule whereas the length of the major axis is greater than the inside diameter of the ferrule. The slot in the protuberance permits a constriction thereof whereby the major axis of the elliptical cross section of the protuberance may be shortened to permit passage of a ferrule about the protuberance.

The method of assembly of a tube fitting of this invention comprises the steps of:

a. providing a ferrule carrying arbor including an elongated shaft about which a plurality of ferrules are disposed, the arbor having an enlarged constrictable head portion;

b. positioning said arbor adjacent the camming mouth of the fitting body;

c. withdrawing said arbor while permitting at least one ferrule to pass over said head;

d. advancing a coupling nut onto the fitting body.

DESCRIPTION OF THE DRAWINGS

FIG. 1 is a fragmentary view, partly in longitudinal section, of a tube coupling employing ferrules to be stored and dispensed according to the principles of this invention;

FIG. 2 is an elevational view of the ferrule holding apparatus of this invention;

FIG. 3 is a sectional view taken along the line 3—3 of FIG. 2;

FIG. 4 is an end view in enlarged scale and taken along the line 4—4 of FIG. 2;

FIG. 5 is an elevational view of a modified form of the ferrule holding apparatus of this invention;

FIG. 6 is an end view taken along the line 6—6 of FIG. 5;

FIG. 7 is an end view similar to FIG. 6 of a modified form of the ferrule holding apparatus of FIG. 5; and FIG. 8 is an end view in enlarged scale and taken along line 8—8 of FIG. 5.

PREFERRED EMBODIMENT

Referring now more particularly to the drawing, FIG. 1 shows a pipe or tube coupling generally indicated at 10 including a coupling body 12 which may be provided intermediate its ends with tool pads 14 or other wrench engaging surfaces. The coupling body 12 is provided with a substantially cylindrical passageway indicated generally at 16. A coaxial counterbore 18 is provided in the coupling body for the purpose of receiving a tube 22. A shoulder 20 is defined in the coupling body as a stop for the end of tube 22.

The counterbore 18 at its outer terminal portion is provided with a coaxial annular tapered or conical camming mouth 24. Camming mouth 24 is defined at an included angle with respect to the coupling axis from about 30° to about 50°, the preferred included angle being about 40° in magnitude. A coupling nut 30 having female threads 28 thereon is adapted to engage coupling body 12 at the threaded portion 26.

A pair of ferrules 42, 44 are interposed in the space defined by the camming mouth 24 and the coupling nut 30 such that as the coupling nut is threadedly advanced upon the coupling body 12, the back ferrule 44 drives the front ferrule 42 into the camming mouth 24 of the coupling body 12. As this occurs, the ferrules are sequentially cammed radially inwardly against the external surface of the tube 22. The movement of the ferrules swages the surface of the tube into a gentle pattern of annular ridges and valleys which prevents withdrawal of the tube from the body. At the same time, the wedging of the front and back ferrules tightly between the surface of the tube and the surface of the camming mouth establishes a seal effective against extremely high pressures and ultra-high vacuums as well.

This invention is directed to an apparatus for storing and dispensing ferrules such as those shown at 42, 44 of FIG. 1.

Previous to this invention, ferrules manufactured and sold by the assignee of this application for use in tube couplings have been shipped and stored in bags. Bag storage of ferrules has been less than satisfactory for a number of reasons. The ferrules themselves are subject to damage as they are intermingled in a single bag and thus are in constant contact with each other. As the ferrules are manufactured under close tolerances, scratching and/or denting of the ferrules when stored in a loose condition in the bag could have an adverse effect on the sealing qualities of the tube joint of which the ferrules eventually become a part. Further, the loose storage of ferrules in bags increases the inventory problem in that the ferrules must be individually counted for purposes of shipping, billing, inventory control and the like.

This invention provides an apparatus for shipping, storing and dispensing ferrules in a manner that minimizes contact of the ferrules with each other thus minimizing scratching and denting of the ferrules. This invention further provides an apparatus for displaying ferrules in a manner so as to minimize counting and inventory control of the ferrules.

There is shown in FIG. 2 one form of the ferrule holding apparatus of this invention comprising a ferrule holding arbor 46 for the purpose of receiving thereon a plurality of ferrules 42, 44. Ferrules 42, 44 are diverse and cooperating and thus must be assembled in the tube fitting in the sequence shown in FIG. 1. The ferrule holding arbor 46 is comprised of an elongated shaft portion 48 and an end abutment 50. As shown in FIG. 3, the elongated shaft 48 of FIG. 2 is generally cruciform in cross section being defined by a pair of intersecting webs 52, 54. A reinforcing rib 53 is provided at the head or protuberance 56. The transverse dimension of the elongated shaft portion 48 of FIG. 2 is slightly less than the internal diameter of the ferrules 42, 44 adapted to be received thereon.

As shown in FIG. 2, the end abutment 50 is an integral portion of the elongated shaft 48 and is of a transverse dimension exceeding the internal diameter of the ferrules such that the ferrules will not slip past the end portion of the arbor. The end abutment 50 of FIG. 2 may take many forms including but not limited to the integral construction of FIG. 2. Thus, the end abutment 50 could also be defined by a pin transversely received in the shaft 48 and having a transverse dimension exceeding the internal diameter of the ferrules. Alternately, the end abutment 50 could take the form of a cap element which may be releasably attached to the shaft 48 by means of screw threads or other fastening means well known to those skilled in the art.

A removable end abutment 50 has a distinct advantage in that the arbor may be more readily loaded with ferrules during packaging without the necessity of passing each ferrule over the head or protuberance 56.

The opposite end of the ferrule holding arbor 46 is defined by a head or protuberance 56 including a transversely extending slot 58. A pair of tapered surfaces 60, 62 (FIG. 2, FIG. 4) are defined in the webs 52, 54 for a purpose to be described more fully hereafter.

As is shown more clearly in FIG. 4, protuberance 56 is generally elliptical in cross section having a minor axis "a" and a major axis "b". The length of the minor axis "a" is slightly less than the internal diameter of the ferrules. The length of the major axis "b" slightly exceeds the internal diameter of the ferrules. The slot 58, however, permits the length of the major axis "b" to be shortened as the resilient legs 64, 66 of the protuberance are cammed toward one another along the major axis "b" of FIG. 4. The slot 58 may be effectively closed through a camming action on the resilient legs 64, 66. The resulting cross section of the collapsed protuberance 56 is very nearly that of a circle having a diameter "a" slightly less than the internal diameter of the ferrules. In this state, the ferrules are free to pass over the protuberance to be either stored on the ferrule holding arbor or to be taken from the arbor.

In the preferred embodiment of FIG. 2, the entire ferrule holding arbor 46 including the elongated shaft portion 48, the end abutment 50 and the protuberance 56 is of one-piece plastic construction. Within the scope of this invention should be considered a wide variety of yieldable materials such as nylon or soft metals. As was previously pointed out, the end abutment 50 may be releasably secured to the shaft portion 48. Similarly, the protuberance 56 may be releasably attached to the shaft 48.

Since tube couplings are manufactured in a variety of sizes, the transverse dimension of the shaft 48 of FIG. 2 may vary depending upon the size of the fitting in which the ferrules to be stored are designed to be used. The length of the shaft portion 48 is such as to provide enough space for storing a predetermined number of ferrules so that for shipping purposes, billing purposes and so on, all that need to be done is to count the number of ferrule holding arbors and multiply by the number of ferrules each arbor is designed to carry.

FIG. 5 shows a modified form of the ferrule holding arbor of this invention. Thus, as is shown in FIG. 5, a ferrule holding arbor 68 is comprised of a generally elongated shaft portion 70, an end abutment 72, and a protuberance 74. The shaft 70 of FIG. 5 is generally cylindrical in shape having a cross-sectional diameter slightly less than that of the ferrules to be received thereon. A bore 71 is provided at one end of shaft 70 for the purpose of receiving a spike, nail or other support member in the event it is desirable to stand the arbor 68 on end abutment 72 for storage or loading of the arbor on a bench or wall surface.

The end abutment 72 is defined as an end flange on the shaft 70 and is integral therewith. As was previously pointed out, the end abutment 72 may take many forms including a pin extending transversely through the end portion of the shaft 70 or a cap attached to the end portion of the shaft 70 by means of screw threads or other attaching means well known to those skilled in the art.

As is more clearly shown in FIG. 6, the protuberance 74 is generally elliptical in section having a minor axis "a" and a major axis "b". A slot 76 extends transversely through the protuberance parallel to the minor axis thereof. The length of the minor axis "a" of FIG. 6 is slightly less than the internal diameter of the ferrules. The length of the major axis "b" of FIG. 6 slightly exceeds the internal diameter of the ferrules such that by construction of the protuberance 74 (thereby tending to close the slot 76) the length of the major axis "b" is shortened thereby changing the cross-sectional shape of the protuberance from an ellipse to a circle having a diameter "a" slightly less than the internal diameter of the ferrules. Such a constriction of the protuberance 74 through an inward camming of the resilient legs 78, 80 permits the ferrules to pass over the protuberance to be either stored about the shaft 70 or removed from the ferrule holding arbor.

In FIG. 7, a modified form of the protuberance of the ferrule holding arbor 68 of FIG. 5 is shown. The protuberance of FIG. 7 is generally circular in cross section and includes a pair of intersecting slots 82, 84. These slots 82, 84 generally define four resilient legs 86, 88, 90 and 92 in the protuberance. As will be noted from FIG. 7, the cross-sectional diameter of the protuberance exceeds the internal diameter of the ferrules. Through inward camming of the resilient legs 86, 88, 90, 92, however, the effective diameter of the protuberance may be decreased until it is slightly less than the internal diameter of the ferrules. The ferrules may thereafter pass over the protuberance to either be stored on the ferrule holding arbor or released therefrom.

In FIG. 8, an end view of the ferrule arbor of FIG. 5 is shown. Bore 71 is defined on the axis of shaft 70 and intersects end abutment 72. The arbor may thus be supported on a bench or wall surface as by disposing the shaft 70 about a spike, nail or other projection having a transverse dimension slightly less than the diameter of bore 71.

Throughout the description of the ferrule holding arbor of this invention and the modifications thereof, the respective protuberance of each embodiment has been described with reference to either a single slot or a pair of intersecting slots. Within the scope of this invention should be considered structures utilizing a plurality of the slots which may or may not intersect and may or may not be coincident with an axis of the protuberance. Since the function of the slots in the protuberance is to permit a constriction of the protuberance to thereby shorten a transverse dimension of the protuberance, the slot or slots may be located in various positions normal to the axis of the longest transverse dimension.

The method of dispensing ferrules from the ferrule holding arbor of this invention will now be described with reference to FIGS. 2 and 5. It will be noted that the protuberance of FIG. 2 includes tapered surfaces 60 and 62 whereas the protuberance 74 of FIG. 5 includes tapered surfaces 78 and 80. When it is desired to place ferrules from the ferrule holding arbor into a fitting body, the tapered surfaces of the protuberance of the ferrule holding arbor are brought into abutment with the flared mouth or camming mouth of the fitting. Such a camming mouth is shown at 24 in FIG. 1. Movement of the ferrule holding arbor into engagement with a respective camming mouth produces an inward camming of the resilient legs toward one another permitting either a single ferrule or a pair of ferrules to be slid over the protuberance into the fitting mouth. The arbor is withdrawn and the coupling nut such as 30 in FIG. 1 is then advanced along the threads on the end of the coupling body 12 to complete the assembly. Thus the same camming mouth 24, FIG. 1, of the fitting body that produces an inward deformation of the front ferrule 42 may also be used to produce an inward camming of the resilient legs of the protuberance of the ferrule holding arbor thereby to permit either a single ferrule or a pair of ferrules to be dispensed from the ferrule holding arbor into the fitting body.

The preferred embodiment of this invention has been described with reference to the twin ferrule design of the tube coupling of FIG. 1. Equally within the scope of this invention should be considered ferrules for tube couplings of the single ferrule design. Applicant's ferrule holding arbor is suitable for any type of ferrule design and should not be considered as limited to the design shown in FIG. 1. Similarly, Applicant's method of dispensing the ferrules from a ferrule holding arbor may be used with any coupling body employing a camming mouth and should not be considered as limited to the coupling body as shown in FIG. 1.

For ease of description, the principles of the invention have been set forth in connection with but a single illustrated embodiment. It is not our intention that the illustrated embodiment nor the terminology employed in describing it be limiting inasmuch as variations may be made without departing from the spirit of the invention. Rather, we desire to be restricted only by the scope of the appended claims.

The invention claimed is:

1. An apparatus for use in the make-up of a tube fitting of the type wherein a plurality of diverse and cooperating generally annular tube fitting elements are assembled in coaxial relation in a particular sequence, and in a particular orientation with respect to the camming mouth of a fitting body, the leading element having a forwardly directed generally tapered nose portion adapted to cooperate with the camming mouth of a fitting body while each trailing element is adapted to cooperate with the element immediately ahead of such trailing element when assembled in a tube fitting, such apparatus comprising in combination;

an elongated shaft;

a plurality of identical groups of generally annular tube fitting elements retained in coaxial relation on said shaft;

said shaft having an outside dimension slightly less than the inside dimension of the tube fitting elements received thereon;

abutment means at one end of said shaft to limit movement of said tube fitting elements in a first direction;

constrictable head means at the opposite end of said shaft to limit movement of said tube fitting elements in a second direction;

said constrictable head means being operable to permit a group of tube fitting elements to be passed over said head upon constricting said head means;

each identical group of tube fitting elements comprising at least two diverse and cooperating generally annular tube fitting elements arranged in a particular sequence relative to each other, and in a particular orientation relative to the camming mouth of the fitting body;

the lead element of the group having a forwardly directed generally tapered nose portion oriented to cooperate with the camming mouth of the fitting body as the group is removed from said shaft;

each trailing element in the group behind the lead element being oriented and positioned in the group to cooperate with an element immediately ahead of such trailing element when the group of tube fitting elements is assembled in a tube fitting.

2. The invention of claim 1 in which said shaft is circular in cross-section having a diameter less than the inside dimension of the tube fitting elements received thereon.

3. The invention of claim 1 in which said shaft is of cruciform cross-section being defined by a pair of intersecting web portions.

4. The invention of claim 3 in which said web portions include a tapered external end portion defining a camming surface.

5. The invention of claim 1 in which said means at one end of said shaft is defined as a fixed abutment integral with said shaft and having a transverse dimension exceeding the internal dimension of the tube fitting elements received on said shaft.

6. The invention of claim 1 in which said constrictable head means is defined as a protuberance having a generally elliptical transverse cross-section with a major and minor axis, the length of said minor axis being substantially equal to or less than the inside dimension of said tube fitting elements and the length of said major axis being greater than the inside dimension of said tube fitting elements, at least one elongated slot in said head parallel to said minor axis whereby said head may be constricted to thereby shorten the length of said major axis to permit passage of said group of tube fitting elements about said head.

7. An apparatus for use in the make-up of a tube fitting of the type wherein a plurality of diverse and cooperating generally annular tube fitting elements are assembled in coaxial relation in a particular sequence, and in a particular orientation with respect to a fitting body, the leading element having a forwardly directed generally tapered nose-portion being adapted to cooperate with a camming mouth of a fitting body while each trailing element is adapted to cooperate with the element immediately ahead of such trailing element when assembled in a tube fitting, such apparatus comprising in combination:

an elongated shaft:

a plurality of identical groups of generally annular tube fitting elements retained in coaxial relation on said shaft;

said shaft having an outside dimension slightly less than the inside dimension of the tube fitting elements received thereon;

means on said shaft at one end of said shaft to limit movement of said tube fitting elements in a first direction;

releasable locking means on said shaft at the other end of said shaft to selectively limit movement of said tube fitting elements in a second direction;

said releasable locking means being operable to permit a group of tube fitting elements to be removed from said shaft;

each identical group of tube fitting elements comprising at least two diverse and cooperating generally annular tube fitting elements arranged in a particular sequence relative to each other, and in a particular orientation relative to the camming mouth of the fitting body such that the lead element of the group is oriented to cooperate with the camming mouth of the fitting body as the group is removed from said shaft and each trailing element of the group behind the lead element is oriented and positioned to cooperate with the element immediately ahead of such trailing element when the group of tube fitting elements is assembled in a tube fitting.

* * * * *